United States Patent [19]

Sakayori et al.

[11] Patent Number: 5,029,983
[45] Date of Patent: * Jul. 9, 1991

[54] LIQUID CRYSTAL DEVICE WITH A SMECTIC CHIRAL LIQUID CRYSTAL

[75] Inventors: Hiroyuki Sakayori, Machida; Ippei Kobayashi, Atsugi, both of Japan

[73] Assignee: Semiconductor Energy Laboratory Co., Ltd., Kanagawa, Japan

[*] Notice: The portion of the term of this patent subsequent to Feb. 27, 2007 has been disclaimed.

[21] Appl. No.: 128,583

[22] Filed: Dec. 4, 1987

[30] Foreign Application Priority Data

Dec. 6, 1986 [JP] Japan ................................ 61-291272
May 15, 1987 [JP] Japan ................................ 62-118599

[51] Int. Cl.⁵ ............................................ G02F 1/133
[52] U.S. Cl. ................................ 350/333; 350/350 S
[58] Field of Search ............... 350/344, 339 F, 350 S, 350/339 R, 333

[56] References Cited

U.S. PATENT DOCUMENTS

| 4,563,059 | 1/1986 | Clark et al. | 350/350 S |
| 4,639,087 | 1/1987 | Cannella | 350/339 R |
| 4,668,051 | 5/1987 | Mourey et al. | 350/350 S |
| 4,712,872 | 12/1987 | Kanbe et al. | 350/350 S |
| 4,712,878 | 12/1987 | Taniguchi | 350/350 S |
| 4,744,637 | 5/1988 | Sekimura et al. | 350/339 F |
| 4,744,639 | 5/1988 | Tsuboyama | 350/344 |
| 4,778,259 | 10/1988 | Kitayama et al. | 350/350 S |
| 4,904,057 | 2/1990 | Sakayori et al. | 350/333 |

FOREIGN PATENT DOCUMENTS

| 0107751 | 8/1979 | Japan | 350/344 |
| 0218423 | 12/1984 | Japan | 350/350 S |
| 0203427 | 9/1986 | Japan | 350/344 |

OTHER PUBLICATIONS

Blinov *Electro-Optical and Magneto-Optical Properties of Liquid Crystals*, 1983, pp. 284-289, published by John Wiley & Sons, Limited.
Iwasaki "Colour Switching in Ferroelectric Smectic Liquid Crystal by Electric Field" Jpn. J. Appl. Phys., vol. 18, No. 12, 1979.
Brunet et al., "Defauts Dans Les Smectiques C Chiraux", Ann. Phys. 1978, vol. 3, pp. 237-248.

Primary Examiner—Stanley D. Miller
Assistant Examiner—Anita Pellman Gross
Attorney, Agent, or Firm—Sixbey, Friedman, Leedom & Ferguson

[57] ABSTRACT

A liquid crystal device can be driven by application of a unipolar electric field to a ferroelectric liquid crystal layer. Without application of an electric field, isotropic characteristics are observed because of a spiral arrangement of the liquid crystal molecules. Under the application of an electric field, a birefringence is observed because of liquid crystal molecules being aligned in one direction. The device can be driven by applying an electric field in one direction and removing the electric field.

2 Claims, 12 Drawing Sheets

SPIRAL PITCH

→ TIME

LIQUID CRYSTAL DEVICE WITH A SMECTIC CHIRAL LIQUID CRYSTAL

BACKGROUND OF THE INVENTION

This invention relates to a liquid crystal device with a smectic chiral liquid crystal.

Many types of thin display devices have been proposed as substitutes for CRT's, such as those equipped with liquid crystal or electrochromic material. Particularly, liquid crystal devices are of interest to researchers for their small electric power consumption.

In recent years, however, the number of pixels on a display has been increasing, while the information to be displayed has been increasing. Although high quality can be accomplished in the case of liquid crystal displays having a relatively small number of pixels, it is difficult to maintain such a quality when liquid crystal devices are manufactured with a large number of pixels, e.g., into a matrix structure of 640×400. In a display having a high resolution, adjacent pixels tend to crosstalk and degrade the overall performance of the display. Several attempts to construct a liquid crystal display with a large number of dense pixels have been conceived. For example, proposed is making use of a ferroelectric liquid crystal as a liquid crystal for such a display, a SBE mode with a conventional twisted nematic liquid crystal as a driving method for the liquid crystal display, a semiconductor device for each pixel, or the like.

There are some shortcomings in manufacturing TN (Twisted Nematic) active matrix displays. In this case, the production costs of semiconductor devices are substantially high and thus the production yield of the same can not be expected to be so high, and therefore, while the picture quality of the display is rather high, it is very difficult to maintain the price of the liquid crystal display proper at a suitable low cost. Furthermore, the response speed of such a conventional device is not so high so that it can not be used for applications which require a quick response. Meanwhile, N. A. Clark et al proposed a new liquid crystal device (Japanease Patent Published Application No. sho56-107216). In the new device are formed a plurality of smectic liquid crystal layers disposed between and perpendicular to a pair of substrates where liquid crystal molecules can be aligned on first and second positions angularly distant from the normal of the layer by $\theta$ or $-\theta$, respectively, as illustrated in FIG. 1. By applying an electric field to the liquid crystal, the liquid crystal molecules can be switched from one position to the other position, allowing displaying in terms of birefringence.

The molecule can be moved from the first position I to the second position II, e.g., by applying a positive electric field normal to the liquid crystal layer, while it can be returned from the second position II to the first position by applying a negative electric field that is, by changing the direction or sense of electric field applied perpendicular to the liquid crystal layer. Furthermore, the liquid crystal molecules keep their position even if the applied electric field is removed, allowing a bistability between the first and second positions.

An example of a switching signal for such a device is illustrated in FIG. 2. As in the figure, the signal consists of a sequence of positive and negative pulses. The switching of the device can be implemented at a speed higher than that attained by a TN liquid crystal device. When the signal input is interrupted, the liquid crystal molecules remain in the positions as they were.

However, in order to establish the bistability, there is an indispensable requirement that a pair of substrates be provided with an interval (inner) space holding a liquid crystal layer of a thickness of only 1–3 microns inbetween, in order to distort and unwind the spirals of the liquid crystal molecules throughout the layer in the normal direction when applying an electric field and to keep this molecular alignment even when the application is removed. It is very difficult to control such a narrow interval between the substrates, and therefore the yield of mass-production tends to be lowered.

SUMMARY OF THE INVENTION

It is therefore an object of the invention to provide a liquid crystal device of a new driving mechanism making use of a ferroelectric liquid crystal.

It is another object of the present invention to provide a liquid crystal device suitable for mass-production.

DETAILED DESCRIPTION OF THE PREFERRED EMBODIMENTS

Figure 1:
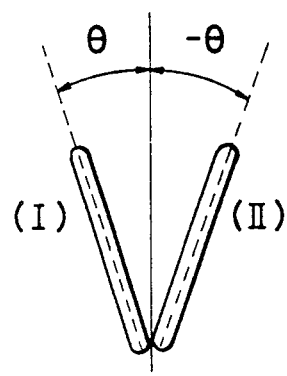
FIG. 1 is an explanatory view showing the conical movement of a molecule of a chiral smectic liquid crystal in response to an applied electric field.
Figure 2:
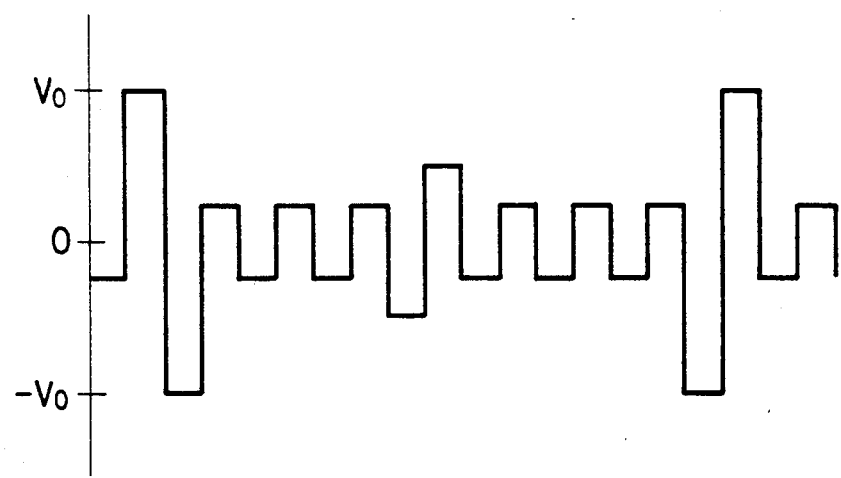
FIG. 2 is a graphical diagram showing an example of an input signal to a liquid crystal device.
Figure 3:
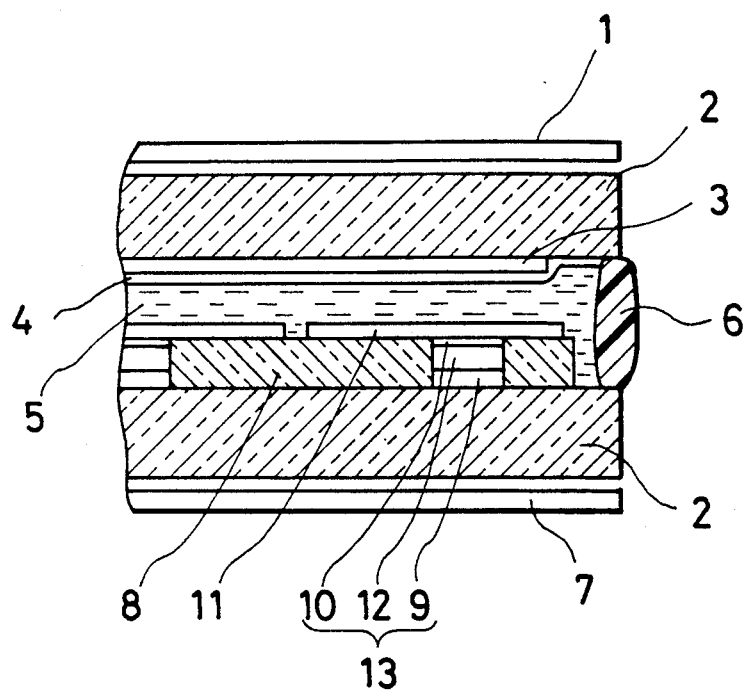
FIG. 3 is a cross section view of a liquid crystal device in accordance with the present invention.

Referring to FIG. 3, a liquid crystal device in accordance with the present invention is illustrated. In the figure, the device comprises a pair of transparent substrates 2 opposed in parallel with an interval of 5–20 microns, e.g., 10 microns, a chiral smectic liquid crystal layer 5 of a ferroelectric ester (the spiral pitch: 1.8 microns, the tilt angle: around 19°) disposed between the substrates 2, a sealing member 6 provided on the periphery of the pair of substrates 2, electrode arrangement 3 and 11 for the liquid crystal device, and polarizing plates 1 and 7. The electrode arrangement consists of first electrode strips 3 each extending in the lateral direction, second electrode strips 9 extending in the direction normal to the plane of the drawing sheet forming a matrix structure in cooperation with the first electrode strips 3, and electrode pads 11 formed on the respective elements of the matrix. The liquid crystal layer is separated into pixels in the form of a matrix by the electrode pads 11 and correspondingly facing portions of the electrode strips 3. Provided between each electrode pad 11 and the respective electrode strip 9 is a rectifying element 13 which consists of a p-i-n diode of a-Si:H comprising a boron-doped p-type semiconductor layer, non-doped intrinsic semiconductor layer and a phosphorous-doped n-type semiconductor layer. The diodes 13 are electrically connected to the electrode pads 11 through shading Mo thin films 10. An addressing signal is supplied to the electrode strip 3. The response speed of the liquid crystal device is about 0.5 milliseconds.

Figure 4A:
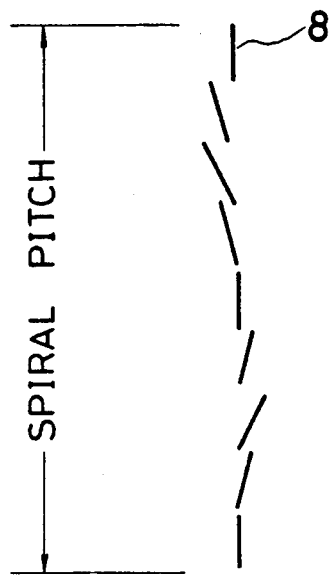
FIGS. 4(A), 4(B) and 4(C) are explanatory views showing the condition of liquid crystal molecule arrangement.
Figure 4B:

Because of the substantially large distance between the substrates 2, the liquid crystal molecules can form spirals extending parallel to the substrate in the absence of an applied electric field as illustrated in FIG. 4(A). By virtue of an applied electric field normal to the spiral and the substrates, the axes of the liquid crystal molecules are aligned at $+19$ or $-19$ degrees to the axis of the spirals as illustrated in FIGS. 4(A) or 4(B) in accordance with the sense of the electric field. The polarization direction of the polarizing plate 1 is oriented parallel to the direction of said $+19$ or $-19$ degrees. The other polarizing plate 7 is provided with its polarization direction perpendicular to that of the polarizing plate 1.

Figure 4C:
Figure 5:
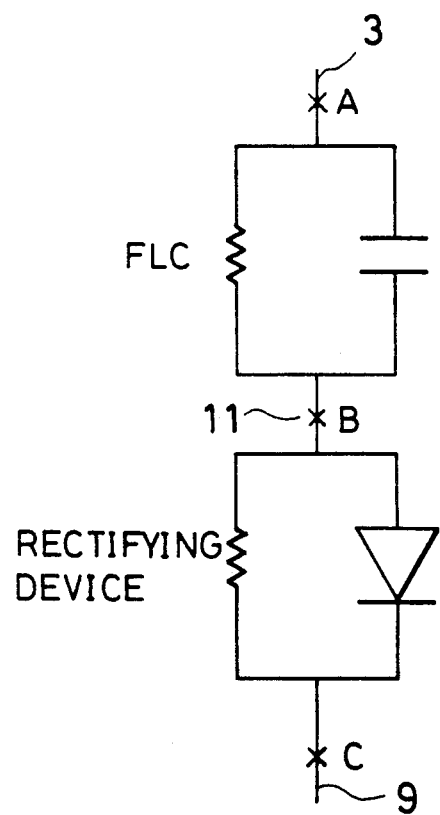
FIG. 5 is an equivalent circuit of a liquid crystal device in accordance with the present invention.
Figure 6A:
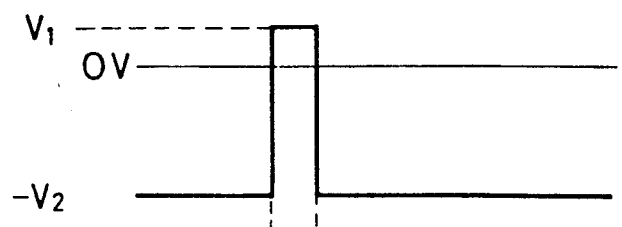
FIGS. 6(A) and 6(B) are graphical diagrams showing a response of a liquid crystal device.
Figure 6B:
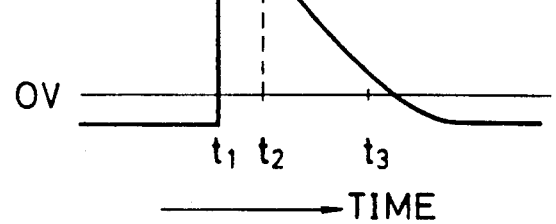
Figure 7:
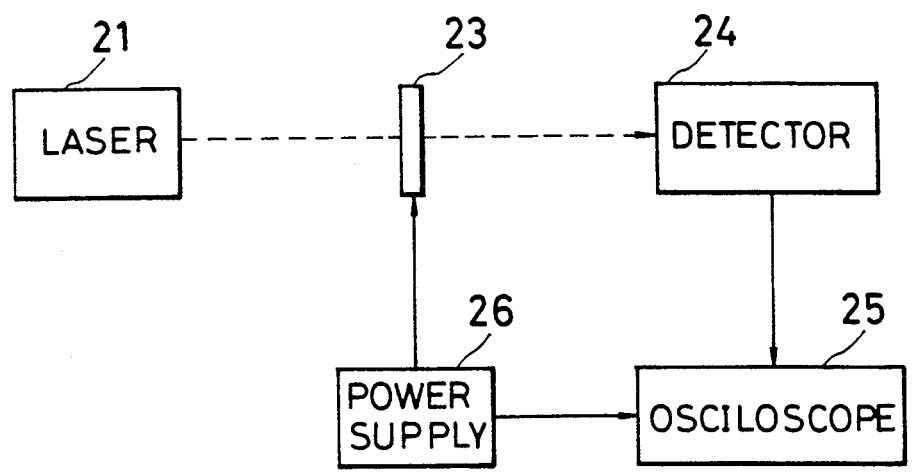
FIG. 7 is a diagram showing experimental equipment for examining the response of a liquid crystal device to a laser beam inputted thereto.

In accordance with the above described structure, a new liquid crystal device is constructed whose driving mechanism is entirely different from existing mechanisms. Namely, the device is driven between a spiral condition as in FIG. 4(A) and an unwinding condition as in FIGS. 4(B) or 4(C). In the former condition, the liquid crystal layer 5 does not exhibit birefringence so that no light can pass through the polarizing plates 1 and 7, making the pixel opaque. In the latter condition, the light entering through the polarizing plate 1 is rotated in the liquid crystal layer so that it can pass through the polarizing plate 7 endowing transmissivity to the pixel. FIG. 5 is an equivalent circuit for one pixel of the liquid crystal device illustrated in FIG. 3. By applying a signal as illustrated in FIG. 6(A) between A and C of FIG. 5, the liquid crystal layer on the pixel is subjected to an electric voltage as illustrated in FIG. 6(B). Measurement was implemented by the equipment as illustrated in FIG. 7. The equipment comprises a laser 21, a liquid crystal device 23 as a sample disposed to receive a laser from the laser 21, a power supply for the liquid crystal device 23, a detector 24 for receiving the laser beam passing through the polarizing plates 2 and the device 3, an oscilloscope 5 for displaying the wave forms of the input signal and the output signal of the liquid crystal device. The tail of the electric voltage applied to the liquid crystal layer accounts for the discharging time ($t_3-t_2$) of the diode 13. In light of the tail, the contrast of the displaying of the device is enhanced even though intermittent signals are supplied to the pixel. The discharging time increases as the ratio of the diode's area to the pixel's area increases.

Figure 8A:
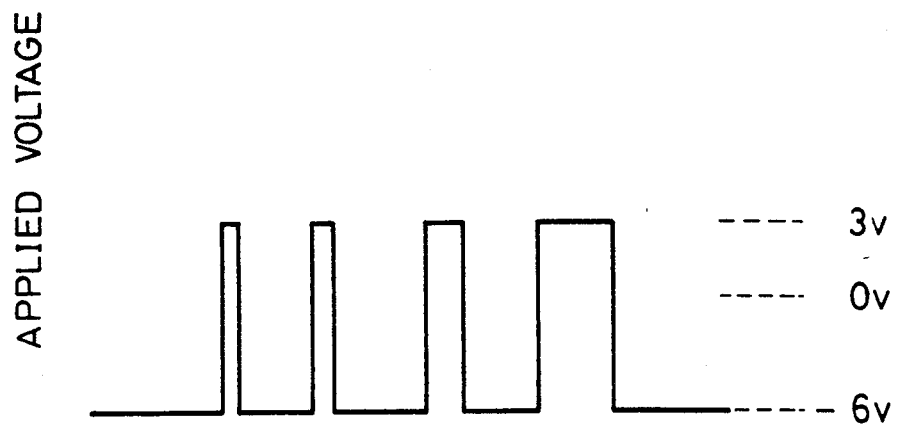
FIGS. 8(A) and 8(B) are diagrams showing the response of a liquid crystal device to an input pulsed signal.
Figure 8B:
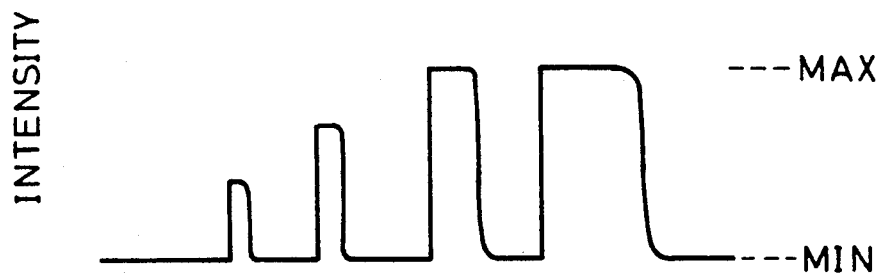
Figure 9A:
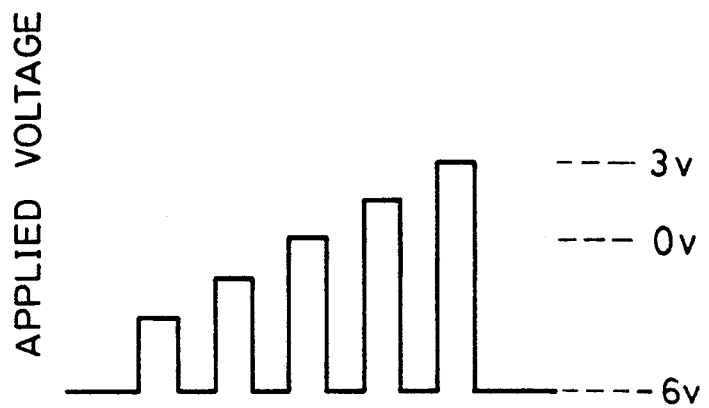
FIGS. 9(A) and 9(B) are diagrams showing the response of a liquid crystal device to an input pulsed signal.
Figure 9B:
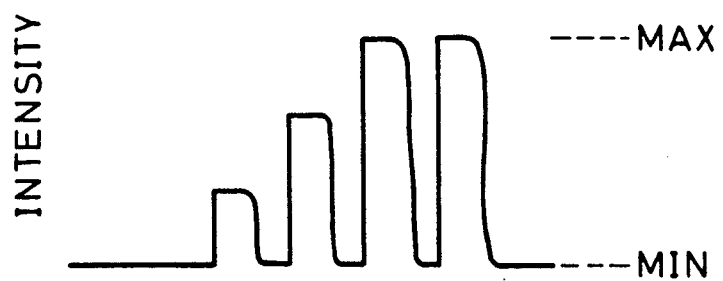

FIGS. 8(A) and FIG. 8(B) show an input signal (applied voltage consisting of pulses and the intensity of the light passing through the subject pixel in response to the signal. As shown in the diagrams, the transmissivity of the pixel can be controlled by changing the pulse width. FIGS. 9(A) and 9(B) also show an input signal and the intensity of passing light. From these figures, it is understood that the transmissivity can also be controlled by varying the magnitude of the applied voltage. Namely, in accordance with the present invention, a liquid crystal device capable of displaying a grey scale can be constructed.

Although the above embodiment makes use of a rectifying element for avoiding flickering, it is not necessarily indispensable from the view of the gist of the present invention. Hereinbelow, description is made in accordance with the experimental result using a liquid crystal device which is constructed in the same manner as the preceding embodiment but without the use of the diodes 13. In this device, the driving system is different from the preceding embodiment. The liquid crystal molecules in this device switch their positions in two states, both forming no spiral. In one state, the liquid crystal molecules are aligned in one direction under application of a bias voltage as shown in FIG. 4(B). By removing and applying a reverse voltage, the liquid crystal molecules are turned by conical movement as shown in FIG. 4(B).

Figure 10A:
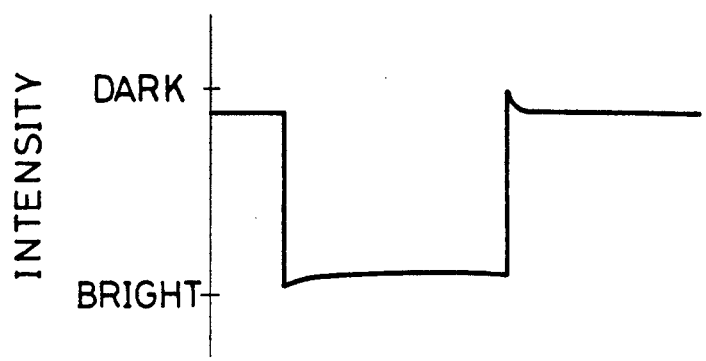
FIGS. 10(A), 10(B) and 10(C) are diagrams showing responses of a liquid crystal device to an input pulsed signal in accordance with another embodiment of the present invention.
Figure 10B:
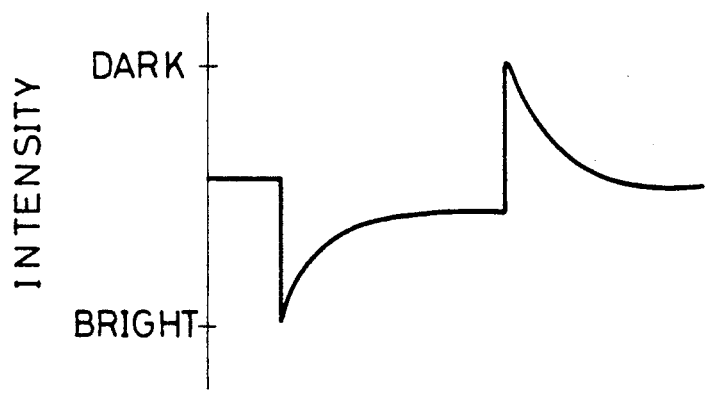
Figure 10C:
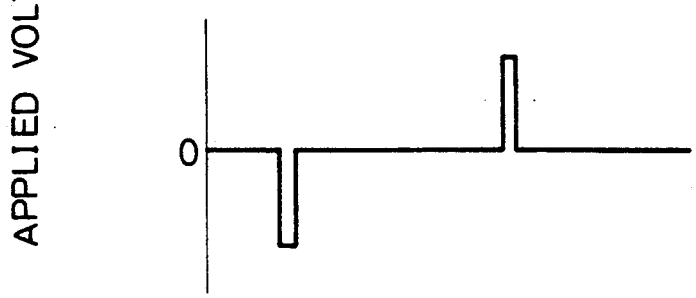
Figure 11A:
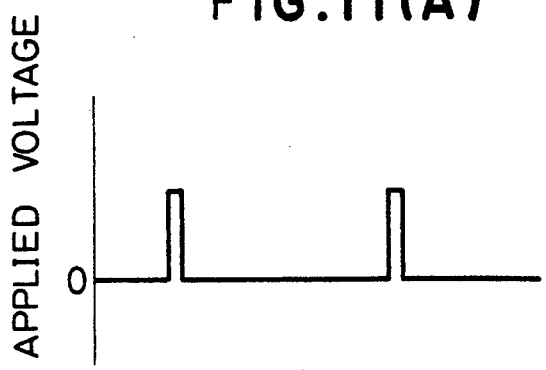
FIGS. 11(A) and 11(B) are diagrams showing the response of a liquid crystal device to an input pulsed signal in accordance with another embodiment of the present invention.
Figure 11B:
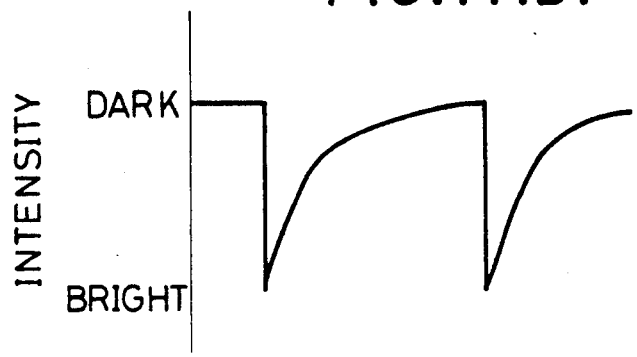

FIG. 10(A) shows the wave form as a response to the input signal as illustrated in FIG. 10(C). This curve shows a memory characteristic of the liquid crystal device. However, when the width of the input pulse is made short, the memory characteristic fades as shown in FIG. 10(B) for this bipolar driven liquid crystal device, and FIG. 11(B) is the response thereto.

Figure 12:
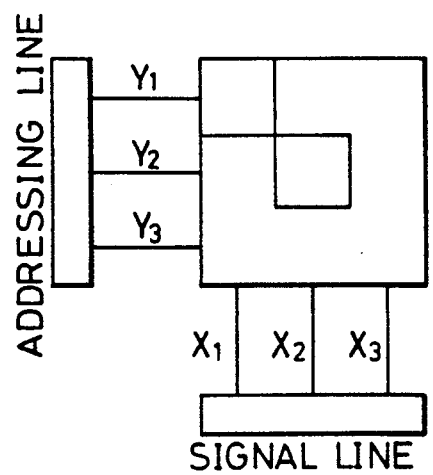
FIG. 12 is a diagram showing the driving system for a liquid crystal device in accordance with another embodiment of the present invention.
Figure 13:
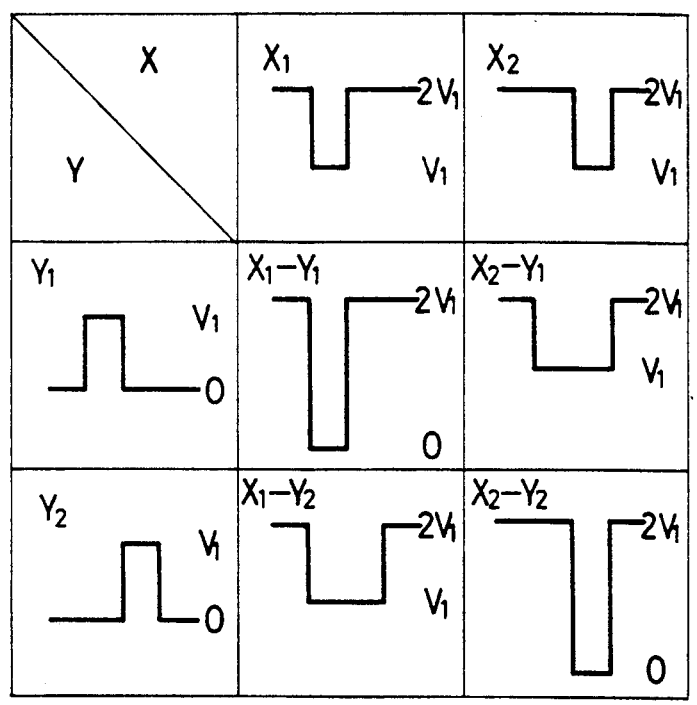
FIG. 13 is a graphical diagram showing driving signals and addressing signals for a liquid crystal device in accordance with another embodiment of the present invention.

One example of a unipolar driven liquid crystal display is illustrated in FIG. 12 which has a 3×3 matrix structure comprising addressing lines $Y_1$, $Y_2$ and $Y_3$ and input lines $X_1$, $X_2$ and $X_3$. In FIG. 13, only input signals to the addressing lines $Y_1$ and $Y_2$ and the input lines $X_1$ and $X_2$ are shown together with corresponding signals applied to respective pixels to explain how the liquid crystal device can be driven corresponding to the illustration of FIG. 12.

Figure 14:
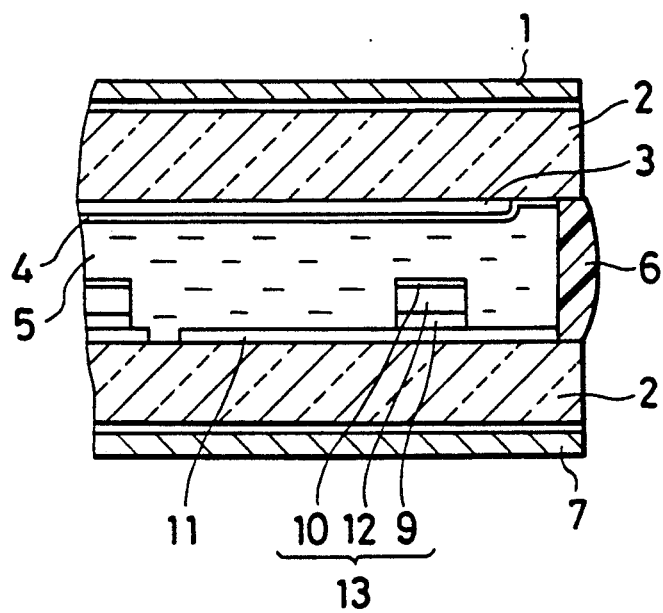
FIG. 14 is a modification of the liquid crystal device in accordance with the present invention.

The invention should not be limited to the above particular embodiments and many modifications and variations may occur to those skilled in the art. For example, diodes may be formed on electrode pads 11 as illustrated in FIG. 14.

We claim:
1. A liquid crystal device comprising:
a pair of substrates;
a ferroelectric liquid crystal layer disposed between said substrates;
at least one electrode provided on both sides of said liquid crystal layer in order to define a plurality of pixels on said liquid crystal layer; and
said liquid crystal device characterized in that a rectifying element is connected in series to said electrode.
2. The device of claim 1 where said rectifying element is a p-i-n diode.

* * * * *